Patented Mar. 11, 1952

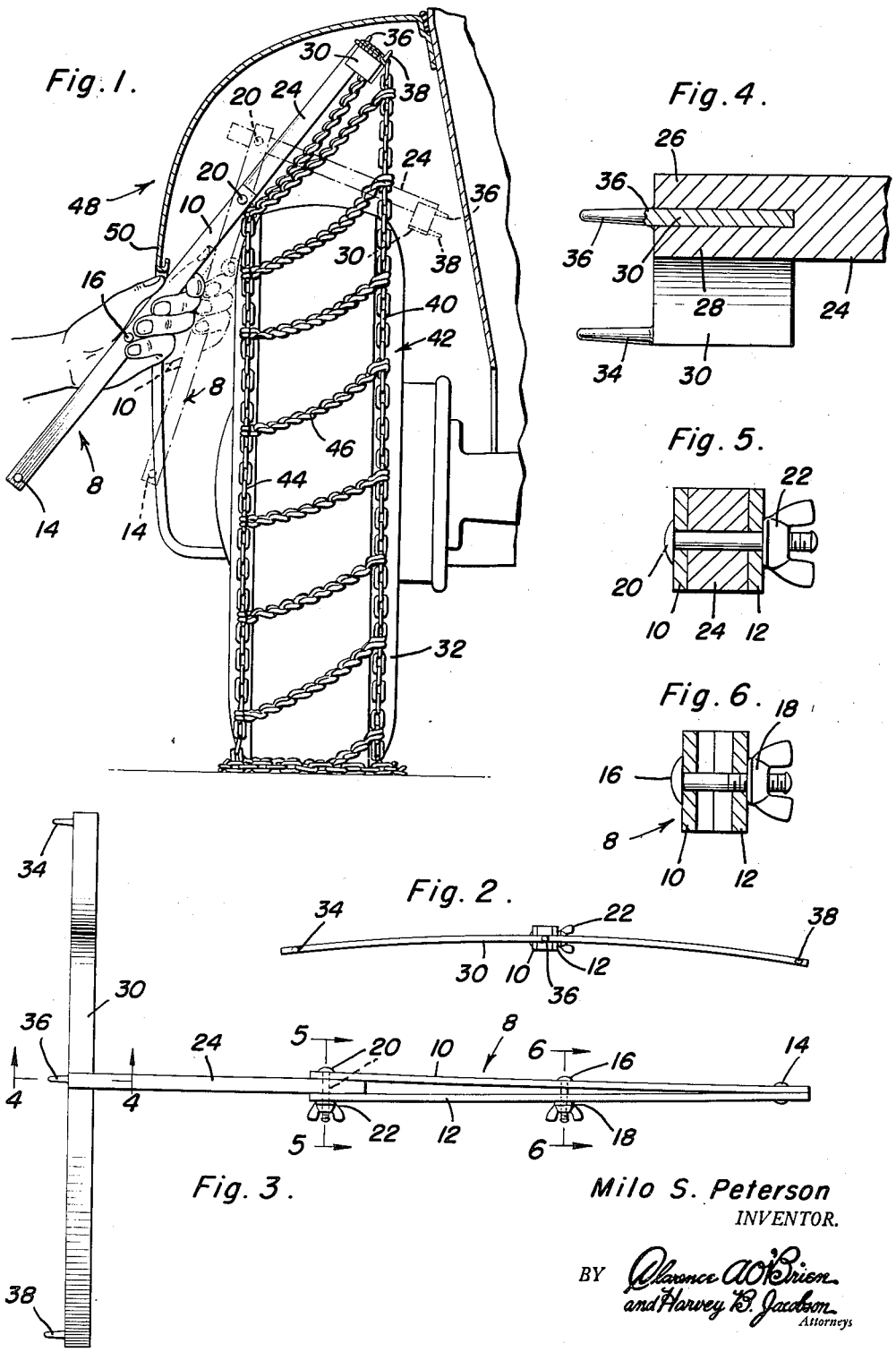

2,588,568

UNITED STATES PATENT OFFICE 2,588,568

TIRE CHAIN MOUNTING TOOL

Milo S. Peterson, Leadville, Colo.

Application January 6, 1950, Serial No. 137,209

2 Claims. (Cl. 81—15.8)

The present invention relates to certain new and useful improvements in hand tools which are expressly adapted to be used in mounting tire chains on motor vehicle wheels and the overall objective is to provide a tool in which users will find their primary needs fully met, contained and conveniently available.

It is a matter of common knowledge that the task of mounting tire chains, especially under adverse weather conditions, involves complications and painstaking and time consuming efforts. This is especially true when one has to mount the chains on a vehicle having fenders with low hanging aprons. Usually, in order to obtain access to the tires, it becomes necessary to jack up the rear axle with one jack and to use, in addition, a bumper jack to raise the apron of said fender sufficiently high above the tire to provide the required space for conveniently draping the chains over the tire.

The art to which the invention relates reveals many and varied styles and forms of chain applying and mounting tools, none of which have met with universal adoption and use due to their inability to attain wanted ends. In reducing to practice the tool which constitutes the present invention, a construction is employed which overcomes accepted objections to previous tools in that it is a comparatively easy matter to position and drape the chains around the tread of the tire in order that the ends of the complemental side chains may be readily fastened together.

More specifically, the invention has to do with a tool having a handle, a reach arm hingedly mounted on the outward end of the handle, and means on the outer end of the arm for catching hold of and locating the inward side chain in order that it may be conveniently piloted into place.

Other objects and advantages will become more readily apparent from the following description and the accompanying illustrative drawings.

In the accompanying sheet of drawings, wherein like numerals are employed to designate like parts throughout the views:

Figure 1 is a view showing a fragmentary portion (in elevation and section) of an automobile showing a conventional tire chain and illustrating the improved chain applicator or mounting tool and the manner in which same is used and operated.

Figure 2 is an end elevation of the tool shown in Figure 3 and observing latter in a direction from left to right.

Figure 3 is a top plan view of the tool with the parts in normal ready-to-use relationship.

Figures 4, 5 and 6 are cross-sections on the planes of the lines 4—4, 5—5 and 6—6 respectively of Figure 3.

The handle means is denoted by the numeral 8 and is a tongs-like unit and embodies a pair of duplicate resilient bar members 10 and 12 riveted at corresponding ends as at 14. The inherent resiliency of the metal is such that the outer free end portions of the members tend to spread apart. To partly restrain and limit the spreading there is a centrally arranged bolt 16 passing through said members or limbs and held in place by a wing nut 18. Another bolt 20 passes through the outer end portions of the limbs and is provided with a thumb nut 22. This serves as a pivotal connection for a rigid reach arm 24. The outer end of the arm (see Figure 4) is bifurcated and the furcations 26 and 28 straddle and are suitably secured to the intermediate portion of a longitudinally bowed adapter 30. The curvature of the adapter 30 conforms somewhat to the curvature of the inflated tire 32. On one edge portion the adapter has longitudinally spaced lugs 34, 36 and 38 which are positioned to engage longitudinally spaced links 40 of the conventional tire chain 42. The other side chain is 44 and the transverse or cross chains are denoted 46. The fender is denoted 48 and the deep drop apron 50.

In using the tool, the limbs 10 and 12 of the handle 8 are put properly under tension through the medium of the bolt 16 and nut 18. Next, the nut 22 is tightened on bolt 20 to frictionally but hingedly bind the reach arm 24 between the coacting ends of said limbs 10 and 12. Therefore, the correct initial or ready-to-use position of the reach arm 24 is one in which it is in axial alignment with the handle 8, as shown in full lines in Figures 1, 2 and 3. By thus bolting 24 between 10 and 12, a folding hinge joint is had; one wherein when the established degree of friction is set by hand the joint stays "put," and when the reach arm 24 and adapter 30 are adequately weighted by the load of the chain 42, the joint then becomes a trip joint. Assuming then that the links 40 are releasably engaged with the lugs 34, 36 and 38, the tool, with the chain attached, may be poked into chain positioning and applying position between the fender and tire, as illustrated in full lines in Figure 1. The hinge joint having been set to fold upon being subjected to a sudden blow or impact, said joint is perched upon and against the tire in the position shown. Now, by giving a jerk or two to the handle 8 it is possible, despite limited clearance for the chain and parts of the tool, to jar and "spring" the hinge and to properly position and apply the cross-chains and inner side chain. If required, the then folded tool may be hoisted to the position shown in dotted lines, just in case it becomes necessary to untangle and "shake" the chain free of the lugs 36, 37 and 38. The clearance space between the fender and wheel may have to be regulated by jacking up the fender to a needed position, as is obvious.

The tool herein shown and described is simple in construction, economical from the standpoint of manufacture and sale, is easy to handle, and is practical and will serve, it is believed, the wanted ends.

Tools or instrumentalities which are handled in different ways by different persons and for this reason experience will be the best teacher in determining upon the best technique in handling and using the tool.

Changes in shape, size, materials and rearrangement of details and parts may be resorted to in actual practice, so long as they do not depart from the spirit of the invention or the scope of the appended claims, as is well understood.

Having described the invention, what is claimed as new is:

1. A tire chain tool of the class shown and described comprising a handle embodying a pair of opposed duplicate resilient limbs riveted together at corresponding inward ends and having longitudinally spaced bolts joining the intermediate and remaining outward end portions, a reach arm hingedly mounted between said limbs on the bolt joining said remaining end portions, a longitudinally bowed member secured intermediate its ends to the outer end of said reach arm and extending at right angles thereto, and applicator lugs carried by said member.

2. A tire chain handling, locating, draping and applying tool comprising a handle adapted to assume a position at right angles to a tire with its outer end resting on the tread of a tire in the space between the latter and overlying fender, a rigid reach arm adapted to extend crosswise of the tire tread, a bolt passing through said outer end and adjacent end of said reach arm, said bolt being in a horizontal plane and allowing said arm to swing downwardly toward said tread in a prescribed arcuate path, a nut carried by said bolt, said bolt and nut providing a regulable friction hinge joint between said arm and handle, said joint being normally stable enough to maintain the arm and handle in linearly straight alignment with each other and serving to permit said arm to fold and swing down toward said tire tread, and an arcuately bowed adapter fixed to the outer end of said arm, the adapter having a curvature conforming to the curvature of the tire, and a plurality of longitudinally spaced lugs projecting from an edge portion of said adapter, said lugs being selectively usable in accommodating links on the adjacent side chain, whereby when the tire chain is hung on said lugs and a nominal blow is imparted to the hinged joint by striking same against the tire, the combined weight of the reach arm, adapter and chain causes the adapter to approach the tire and apply the chain on the tire.

MILO S. PETERSON.

REFERENCES CITED

The following references are of record in the file of this patent:

UNITED STATES PATENTS

| Number | Name | Date |
|---|---|---|
| 1,559,355 | Oakley | Oct. 27, 1925 |
| 2,157,687 | Briggs | May 9, 1939 |
| 2,280,316 | Spock | Apr. 21, 1942 |
| 2,293,545 | Hewel | Aug. 18, 1942 |
| 2,323,917 | Kibler | July 13, 1943 |